Patented June 24, 1941

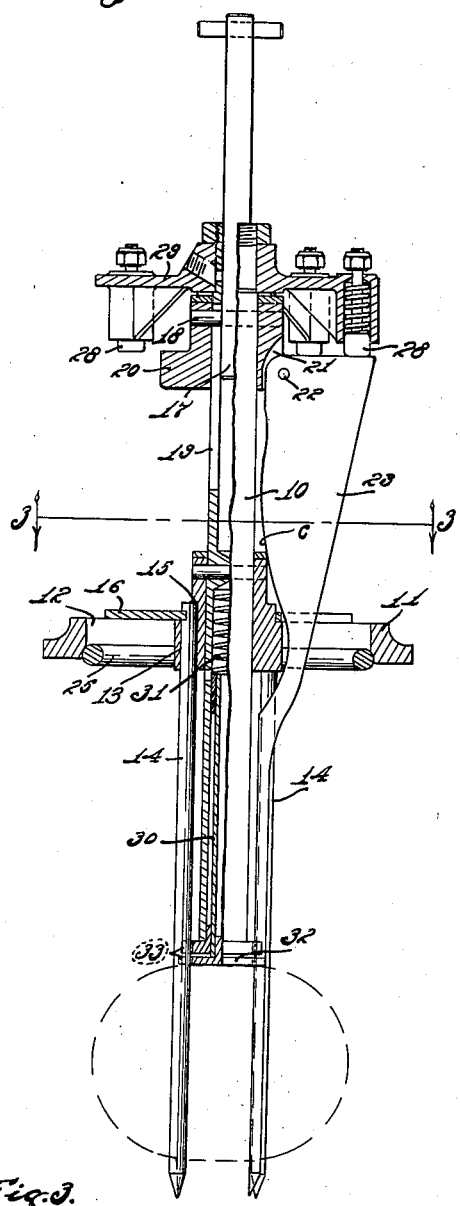
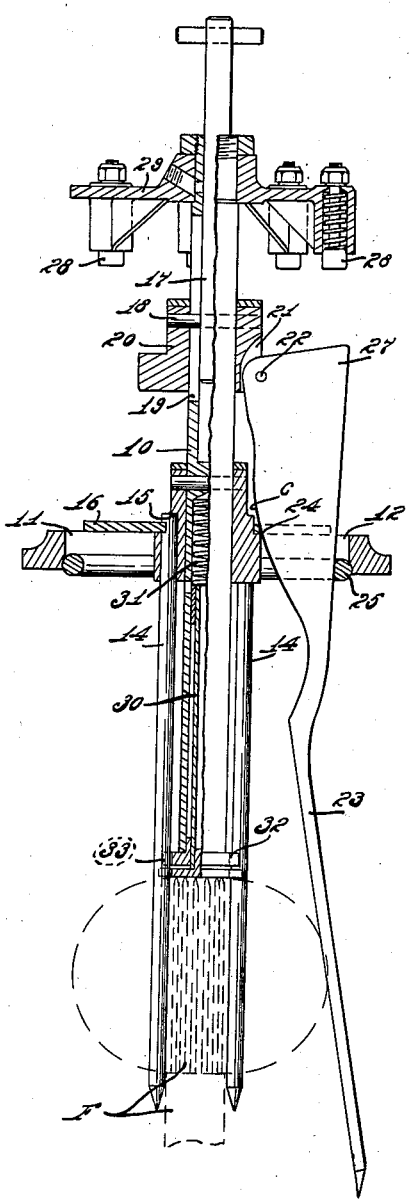
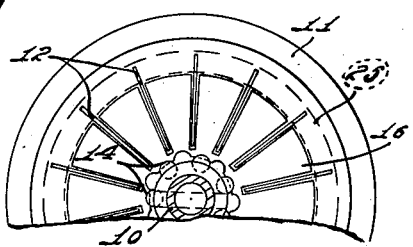
INVENTOR.
Ralph Polk Sr. and
Ralph Polk Jr.,
BY Hood & Hahn
ATTORNEYS.

2,246,896

UNITED STATES PATENT OFFICE 2,246,896

APPARATUS FOR SECTIONIZING CITRUS FRUITS

Ralph Polk, Sr., Miami, and Ralph Polk, Jr., Haines City, Fla., assignors to The Polk Development Company, Tampa, Fla., a copartnership of Florida Application September 28, 1938, Serial No. 232,024

4 Claims. (Cl. 146—3)

The object of our invention is to provide an improved tool by means of which integument-free juice-cell-groups of citrus fruits, particularly grapefruits, may be segregated.

The accompanying drawings illustrate an embodiment of our invention:

Fig. 1 is an axial section of our improved tool from which all but one of the stripper blades have been omitted, and with the parts at one extreme relation;

Fig. 2 is an axial section like Fig. 1 with the parts at the other extreme relation;

Figure 4:
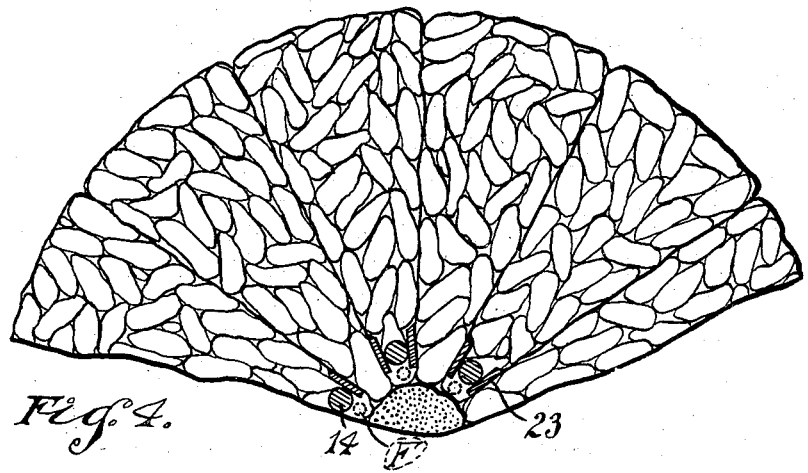
Figure 5:
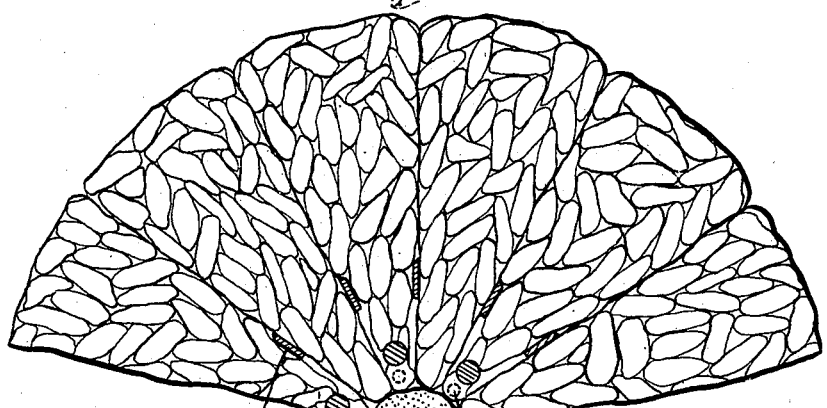
Figure 6:
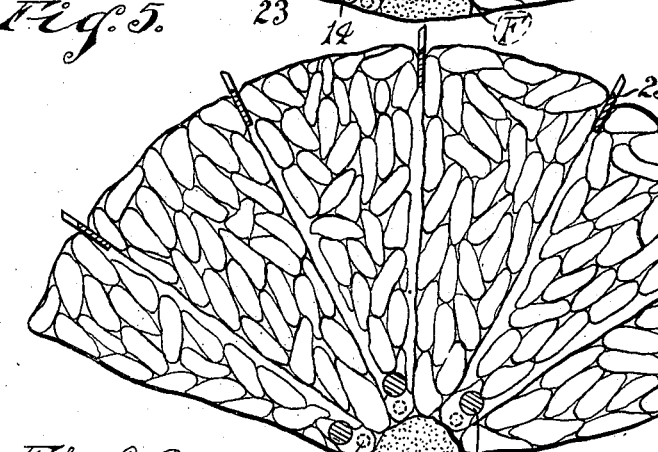

Fig. 3 a section on line 3—3 of Fig. 1;

Fig. 4 is a horizontal section in a plane just above the fruit, showing, in plan, a fragment of a peeled fruit and showing a corresponding fragment of a group of our tools in initial position projected into the fruit;

Fig. 5 a view similar to Fig. 4 with the tool blades partially advanced in their outward swinging movement; and Fig. 6 a similar view with the blades in their outer position.

In the drawings 10 indicates a main shank, provided, intermediate its length with a collar 11 having a plurality of pairs (conveniently seven) of radial slots 12—12. The hub of collar 11 is provided with a plurality (conveniently seven) of parallel bores 13, in which are removably mounted a circular series of pins 14 each of which is so positioned that it may be projected through the apex of a fruit segment between the flaring radial integuments of that segment without rupture of those integuments. For grapefruits these pins may be about 5/16" in diameter. Each pin, at its upper end, abuts a shoulder 15 and near its upper end is notched to receive a locking ring 16.

In the upper tubular end of shank 10 is a reciprocable plunger 17 having a pin 18 projecting through slots 19 in shank 10 into a stripper-blade carrier 20 slidable on the shank. Carrier 20 has pairs of radial slots 21, corresponding in number to pins 14 and in each of these slots is pivoted, at 22, a depending stripper finger 23, a pair of fingers flanking each of pins 14.

Each finger 23 is quite thin and the fruit-penetrating lower end is quite narrow, as shown in the drawings so that this lower end is quite flexible laterally. Each finger 23 is projected downwardly through a slot 12 of collar 11 and the inner edge of the upper portion of the finger is cammed, as indicated at C, to engage a shoulder 24 at the inner end of slot 12, the shape of the cam being such that when carrier 20 is in its upper position the lower end of finger 23 will lie alongside and parallel with a pin 14 (Fig. 1) and, as collar 20 moves downwardly toward collar 11, the finger 23 will be swung outwardly to the position shown in Fig. 2. A buffer ring 25 limits the outward swing of finger 23. Upon return of carrier 20 to its normal upper position on shank 10 the heel 27 of finger 23 engages one of the spring pressed abutments 28 carried by flange 29 attached to the upper end of shank 10, one of such abutments being provided for each finger 23.

Telescoped within the tubular lower end of shank 10 is a plunger 30 normally urged downwardly by a light spring 31. The lower end of plunger 30 carries a fruit-engaging head 32 peripherally notched at 33 to receive and be guided upon pins 14.

The average grapefruit contains from 12 to 16 segments of which one or two are likely to be too narrow for commercial use, and while our tool might be provided with ten to fourteen pins 14 and associated stripper finger pairs, we have obtained better results by providing our tools with five to seven pins 14 and their associated stripper finger pairs and using the tool twice on each fruit. Our tool is designed as an element of an automatic machine but, for convenience, we have illustrated it and described its details, as a separate entity.

In use a peeled fruit is impaled on a holder fork F, indicated in dotted lines in Fig. 2, the tines of which form a circular series of smaller diameter than the circular series of pins 14 and penetrate the fruit within the apices of the segmental integuments. Axially extending voids are then formed within the apices of the segment integuments thereby removing any seeds which may be present.

Thereupon pins 14 and their flanking stripper fingers 23 are projected into the fruit through these voids until the lower ends of fingers 23 have fully penetrated.

In this position the lower end of each stripper finger lies close and substantially parallel to the juice-cell face of one of the radial integuments. Thereupon, shank 10 being held stationary, carrier 20 is moved downwardly to the position shown in Fig. 2 thereby swinging the lower ends of the stripper fingers outwardly between the juice-cell-group and the adherent radial integument.

Where the stripper fingers are provided two for each pin 14, the above-described operation results in a complete segregation of the juicecell-groups from the integument or "rag" remaining on the fork.

It will be readily understood that our tool may be formed with only one stripper finger 23 for each pin 14, in which case each juice-cell-group would be separated from one of the radial integuments, whereupon other means may be employed to obtain complete segregation.

It will also be understood that, by making the stripper fingers less flexible laterally, the pins 14 may be omitted.

However, we have found that the combination of pin 14 and flanking stripper finger appears to give the best results.

We claim as our invention:

1. A tool for segregating integument-free juice-cell groups of citrus fruits, comprising, a main shank, fruit impaling means carried by said shank, a stripper-blade-carrier axially slidable on said shank, a stripper-blade mounted on said carrier to shift axially therewith and at least in part movable radially of the shank, said shank and blade having inter-engaging surfaces whereby movement of the blade axially of the shank will cause outward movement of at least part of the blade, and means acting upon the blade, upon movement of the blade-carrier on the shank in the opposite direction, to cause inward movement of the radially displaced part of the blade.

2. A tool of the character defined in claim 1, wherein the shank carries a fruit-penetrating pin radially offset from and parallel with the shank axis and flanked by the lower end of the stripper blade when said blade is in fruit-penetrating position.

3. A tool of the character defined in claim 1, wherein the means for returning the stripper blade to normal fruit-penetrating position is an abutment carried by the shank.

4. A tool of the character defined in claim 1, wherein the shank carries a fruit-penetrating pin radially offset from and parallel with the shank axis and flanked by the lower end of the stripper blade when said blade is in fruit-penetrating position, and the means for returning the stripper blade to normal fruit-penetrating position is an abutment carried by the shank.

RALPH POLK, Jr.
RALPH POLK, Sr.